United States Patent
Bordin et al.

(10) Patent No.: US 11,707,901 B2
(45) Date of Patent: Jul. 25, 2023

(54) MOULD AND METHOD FOR PRODUCING FOOTWEAR

(71) Applicant: STEMMA SRL, Cornuda (IT)

(72) Inventors: Ettore Bordin, Montebelluna (IT); Stefano Pellizzari, Montebelluna (IT)

(73) Assignee: STEMMA SRL, Cornuda (IT)

( * ) Notice: Subject to any disclaimer, the term of this patent is extended or adjusted under 35 U.S.C. 154(b) by 274 days.

(21) Appl. No.: 17/289,361

(22) PCT Filed: Oct. 29, 2019

(86) PCT No.: PCT/IB2019/059251
§ 371 (c)(1),
(2) Date: Apr. 28, 2021

(87) PCT Pub. No.: WO2020/089784
PCT Pub. Date: May 7, 2020

(65) Prior Publication Data
US 2021/0379854 A1 Dec. 9, 2021

(30) Foreign Application Priority Data
Oct. 30, 2018 (IT) .................. 102018000009893

(51) Int. Cl.
*B29D 35/14* (2010.01)
*B29D 35/08* (2010.01)

(52) U.S. Cl.
CPC ......... *B29D 35/148* (2013.01); *B29D 35/082* (2013.01); *B29D 35/084* (2013.01); *B29D 35/142* (2013.01)

(58) Field of Classification Search
CPC .. B29D 35/142; B29D 35/148; B29D 35/082; B29D 35/084; B29D 35/081; B29D 35/08; B29D 35/0036; B29D 35/061
See application file for complete search history.

(56) References Cited

U.S. PATENT DOCUMENTS 2,256,329 A * 9/1941 Rollmann ............ B29D 35/122
264/261
3,444,590 A * 5/1969 Ludwig ................ B29D 35/081
425/119

(Continued)

FOREIGN PATENT DOCUMENTS

EP 0407688 A2 1/1991
FR 2435219 A1 4/1980

(Continued)

OTHER PUBLICATIONS

PCT International Search Report and Written Opinion dated Jan. 31, 2020 for Intl. App. No. PCT/IB2019/059251, from which the instant application is based, 12 pgs.

*Primary Examiner* — Emmanuel S Luk
(74) *Attorney, Agent, or Firm* — Fredrikson & Byron, P.A.

(57) ABSTRACT

The present invention relates to a mould (10) for producing footwear (1) by means of direct injection onto the upper (2) of a sole (3), comprising a tread (5) and a midsole (4), wherein the midsole (4) is composed of a first layer (6) and a second layer (7). The mould (10) comprises a base (12), a pair of first half-rings (14), a pair of second half-rings (16), a first cover (18), a second cover (20) and a mould last (22). In accordance with the invention the mould (10) comprises gripping means (24) designed to fix selectively the first half-rings (14) to the base (12) or to the second half-rings (16). The present invention also relates to a method for producing footwear (1) using said mould (10).

19 Claims, 11 Drawing Sheets

(56) References Cited

U.S. PATENT DOCUMENTS

| | | | | |
|---|---|---|---|---|
| 3,547,602 A * | 12/1970 | Taylor | ................ | B29D 35/148 |
| | | | | 29/463 |
| 3,671,621 A * | 6/1972 | Tatsuo | ................ | B29D 35/082 |
| | | | | 425/134 |
| 3,677,679 A * | 7/1972 | Christie | ................ | A43D 89/00 |
| | | | | 425/441 |
| 4,810,178 A * | 3/1989 | Proll | ................ | B29D 35/082 |
| | | | | 425/576 |
| 5,433,022 A * | 7/1995 | Lo | ................ | B29C 43/146 |
| | | | | 36/25 R |
| 5,667,738 A * | 9/1997 | Krajcir | ................ | B29D 35/061 |
| | | | | 264/572 |
| 2005/0116383 A1 * | 6/2005 | Sommerlund | ......... | B29D 35/06 |
| | | | | 264/244 |
| 2015/0050379 A1 * | 2/2015 | Ginns | ................ | B29D 35/10 |
| | | | | 425/500 |
| 2016/0354987 A1 * | 12/2016 | Baggen | ................ | B29D 35/128 |
| 2020/0223167 A1 * | 7/2020 | Bordin | ................ | B29D 35/081 |
| 2022/0032567 A1 * | 2/2022 | Hernandez Hernandez | ................ | |
| | | | | A43B 13/12 |

FOREIGN PATENT DOCUMENTS

| | | |
|---|---|---|
| IT | 102017000108402 A1 | 3/2019 |
| WO | 2018177684 A1 | 10/2018 |

* cited by examiner

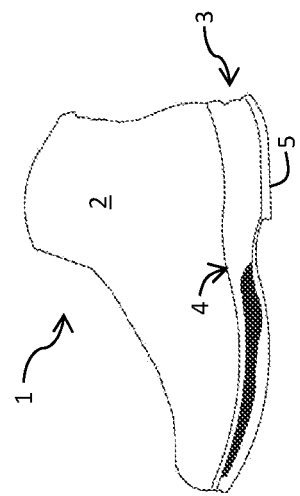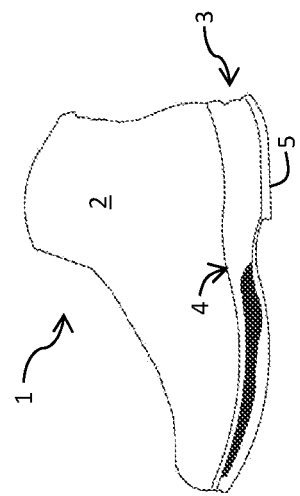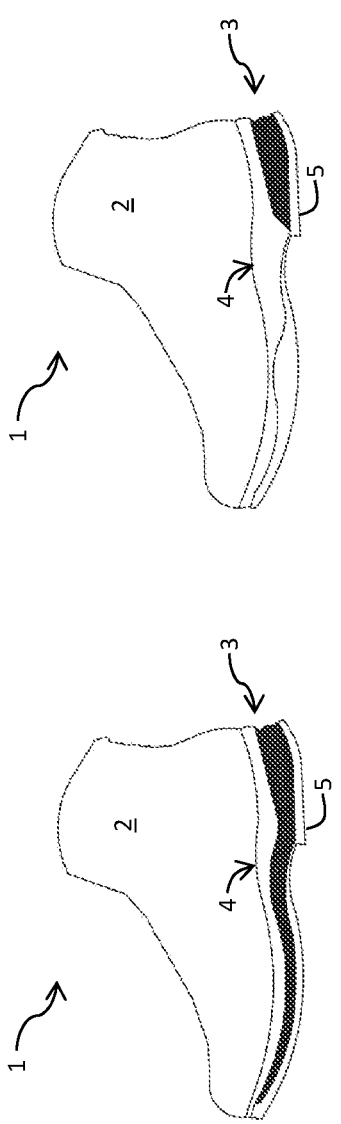
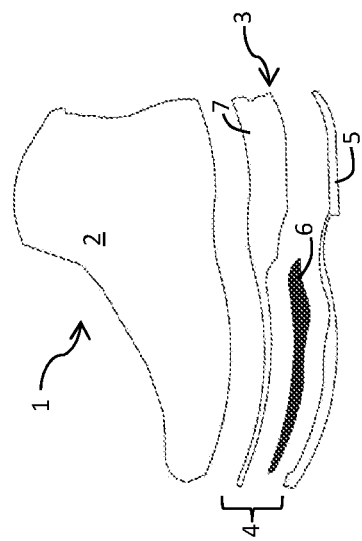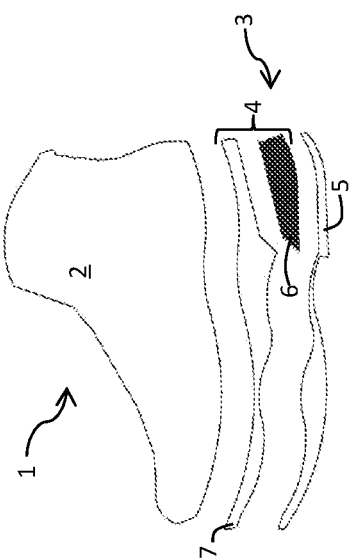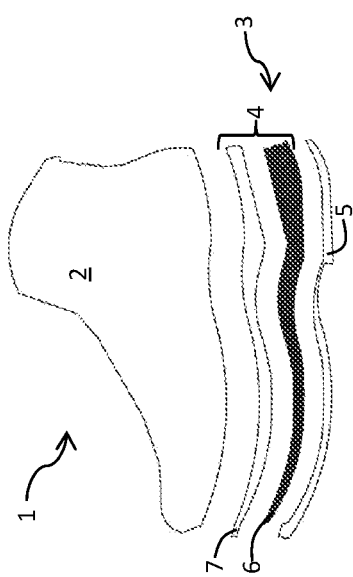

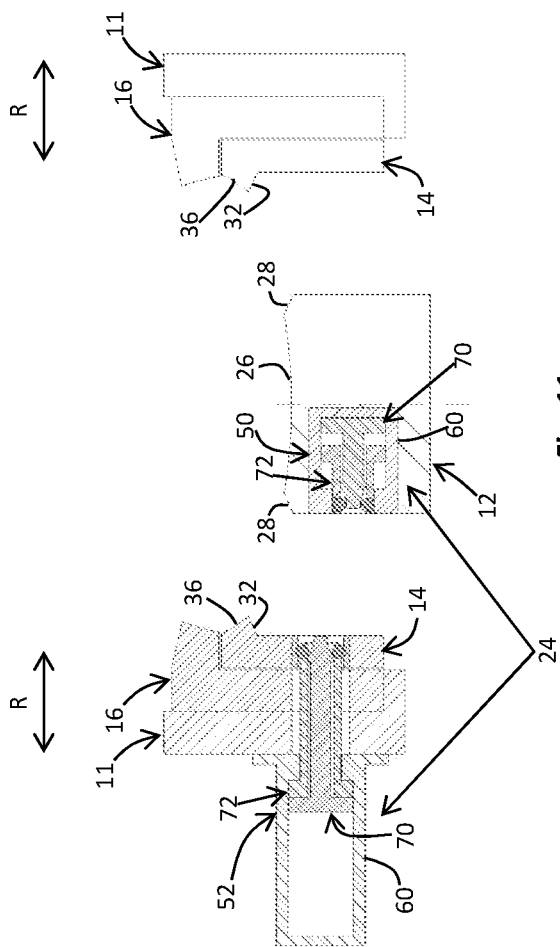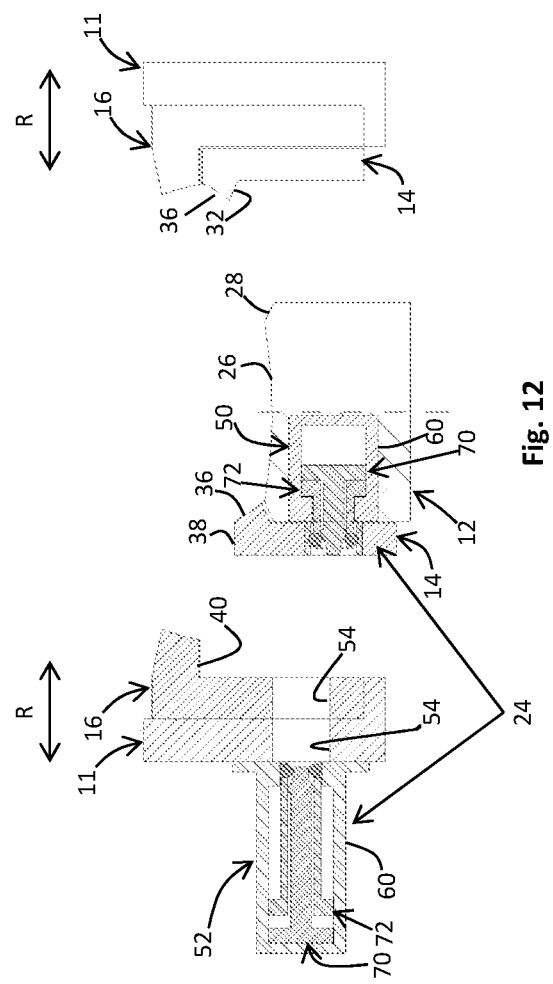

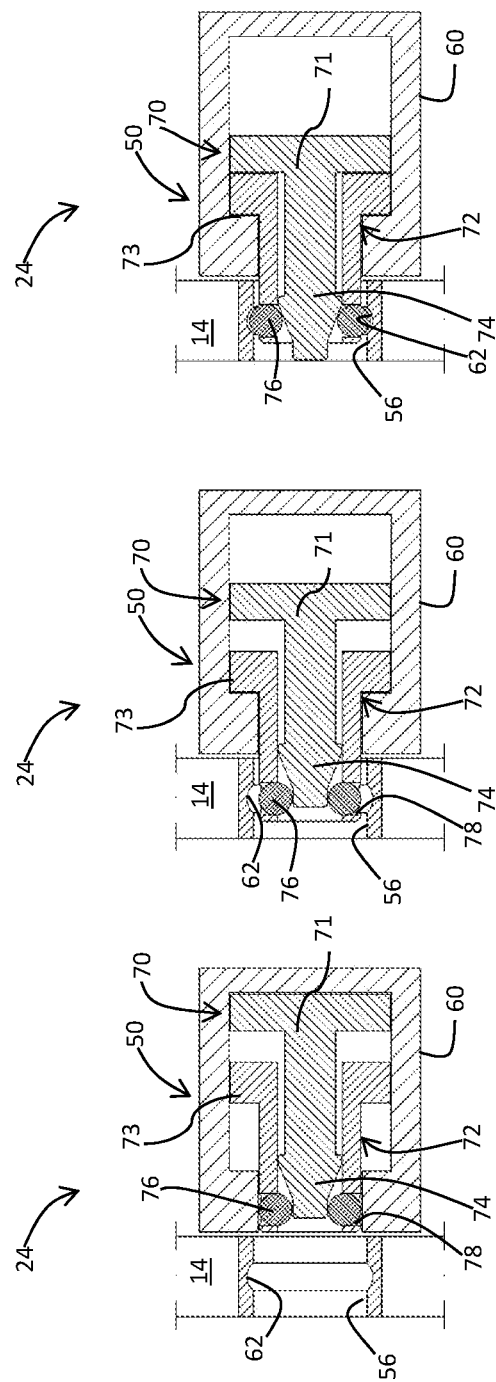

MOULD AND METHOD FOR PRODUCING FOOTWEAR

RELATED APPLICATIONS

This application is a 35 U.S.C. 371 national stage filing from International Application No. PCT/IB2019/059251, filed Oct. 29, 2019, which claims priority to Italian Application No. 102018000009893, filed Oct. 30, 2018, the teachings of which are incorporated herein by reference.

FIELD OF THE INVENTION

The present invention relates to a mould and to a method for producing footwear. In particular, the present invention relates to a mould and to a method for producing footwear with multi-layer soles by means of direct injection onto the upper.

Even more particularly, the present invention relates to a mould and to a method for producing footwear with triple-layer soles by means of direct injection onto the upper.

BACKGROUND

It is known to provide, by means of a method for direct injection onto the upper, footwear having a sole formed by three different layers.

Examples of such footwear 1 are schematically shown in FIGS. 1-3.

In this type of footwear 1 the sole 3 generally comprises a tread 5, preferably made of rubber or thermoplastic polyurethane (TPU), and a midsole 4, usually made of polyurethane, preferably of the expanded type.

The midsole 4, in turn, as schematically shown in FIGS. 1A, 2A and 3A which show exploded views of FIGS. 1-3, may comprise a first layer 6 and a second layer 7 which, in addition to having different shapes and sizes, may be made with different colours and materials depending on the aesthetic and mechanical properties required of the sole.

Various moulding methods for manufacturing the footwear shown in FIGS. 1-3 are known. According to a first method a manufactured article composed of the tread 5 and the first layer 6 of the midsole 4 is made separately by means of a first mould.

In this case the tread 5 may be made of rubber or TPU and the first layer 6 of the midsole is made preferably of polyurethane.

This manufactured article is then loaded inside a second mould, composed of a base, a pair of half-rings and a mould last onto which the upper 2 of the footwear is fitted.

This second mould is preferably mounted on a mould-holder station of a rotating or static machine.

The half-rings are intended to enclose with their bottom edge the base of the mould and with their top edge the upper 2 which is fitted onto the mould last, so as to define a mould cavity having a shape and dimensions the same as those of the second layer 7 of the midsole 4.

The polymeric material is then injected inside this cavity so as to form the second layer 7 and complete the sole 3.

This method involves a not insignificant cost for the acquisition or the production of the manufactured article composed of the tread 5 and the first layer 6 of the midsole.

Moreover, in order to ensure adhesion between the manufactured article and the polymeric material subsequently injected in order to complete the sole, it is necessary for the upper surface of the manufactured article, which is intended to come into contact with the second layer 7, to be treated by means of the application of glues or by means of a roughing operation.

A second moulding method is described in IT102017000108402 in the name of the same Applicant.

This document describes a mould composed of a base, a first pair of half-rings, a cover, a second pair of half-rings and a mould last.

The first half-rings are designed to be brought together so as to abut against the base and the cover, so as to form a first mould cavity. This first mould cavity, inside which the tread 5 moulded in a separate mould is loaded, is used to obtain the first layer 6 of the midsole 4.

Thereafter, with the first half-rings abutting against the base, the second half-rings are designed to be brought together, so as to be superimposed on the first half-rings and abut against the upper 2, which has been fitted onto the mould last, so as to form a second mould cavity for moulding the second layer 7 of the midsole 4.

The mould used in this method is characterized in that the first half-rings are provided with guiding means which are designed to engage slidably with corresponding guiding means provided in the base. These guiding means allow the first half-rings to be moved apart and brought together. Furthermore, the first half-rings may be hinged to these guiding means at the bottom, so as to be able to rotate about a substantially horizontal axis of rotation, in order to facilitate extraction of the footwear.

This mould is widely favoured since it may be used in combination with moulding machines of the conventional type, without the need for structural modifications. However, it is necessary for the tread 5 of the sole to be moulded separately and this may result in an increase in the costs and the production time.

The object of the present invention therefore is that of overcoming the drawbacks mentioned with reference to the prior art.

BRIEF SUMMARY OF EMBODIMENTS OF THE INVENTION

A first task of the present invention is to provide a mould for producing footwear with triple-layer soles by means of direct injection onto the upper, which allows the manufacture, in sequence, of the tread and the two layers of the midsole without having to use additional moulds.

A second task of the present invention is to provide a mould for producing footwear with triple-layer soles by means of direct injection onto the upper, which may be used in combination with moulding machines of the conventional type without the need for structural modifications.

A further task of the present invention is to provide a method for producing footwear with triple-layer soles by means of direct injection onto the upper, which is advantageous in terms of cost and efficiency compared to the known methods.

The object and the tasks described above are achieved with a mould and method according to the claims.

BRIEF DESCRIPTIONS OF DRAWINGS

The characteristic features and further advantages of the invention will emerge from the description, provided hereinbelow, of a number of examples of embodiment, provided by way of a non-limiting example, with reference to the accompanying drawings in which:

FIG. 1-3 shows in schematic form sides view of footwear which can be obtained with the mould and method according to the invention;

FIGS. 1A-3A show respectively, exploded views, of FIGS. 1-3;

FIGS. 11 and 12 show views similar to that of FIG. 10, but relating to different operating configurations;

FIGS. 13A, 13B and 13C show detailed views of an embodiment of the gripping means of a mould according to the invention in three different operating configurations;

DETAILED DESCRIPTION OF EMBODIMENTS OF THE INVENTION

For the purposes of the present invention, the expression "abut against" is understood as meaning that the components of the mould are brought together so as to be placed in direct contact or to define a burr plane, the burr plane being provided so as to allow a small part of the material injected/cast/sprayed inside the mould to flow outside of the mould during the polymerization reaction.

Figure 7:
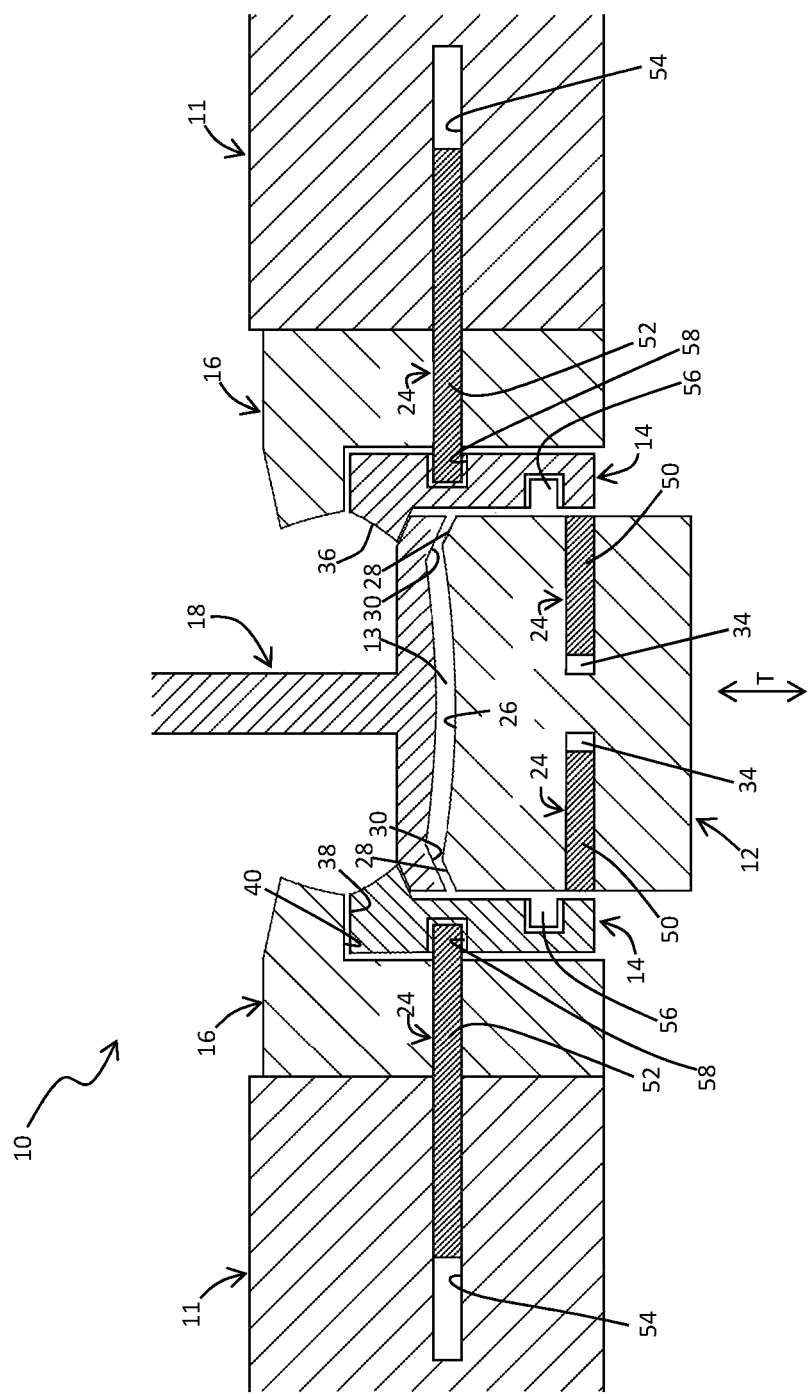
FIGS. 7-9 show schematic cross-sectional views of the mould according to the invention in different operating configurations.
Figure 8:
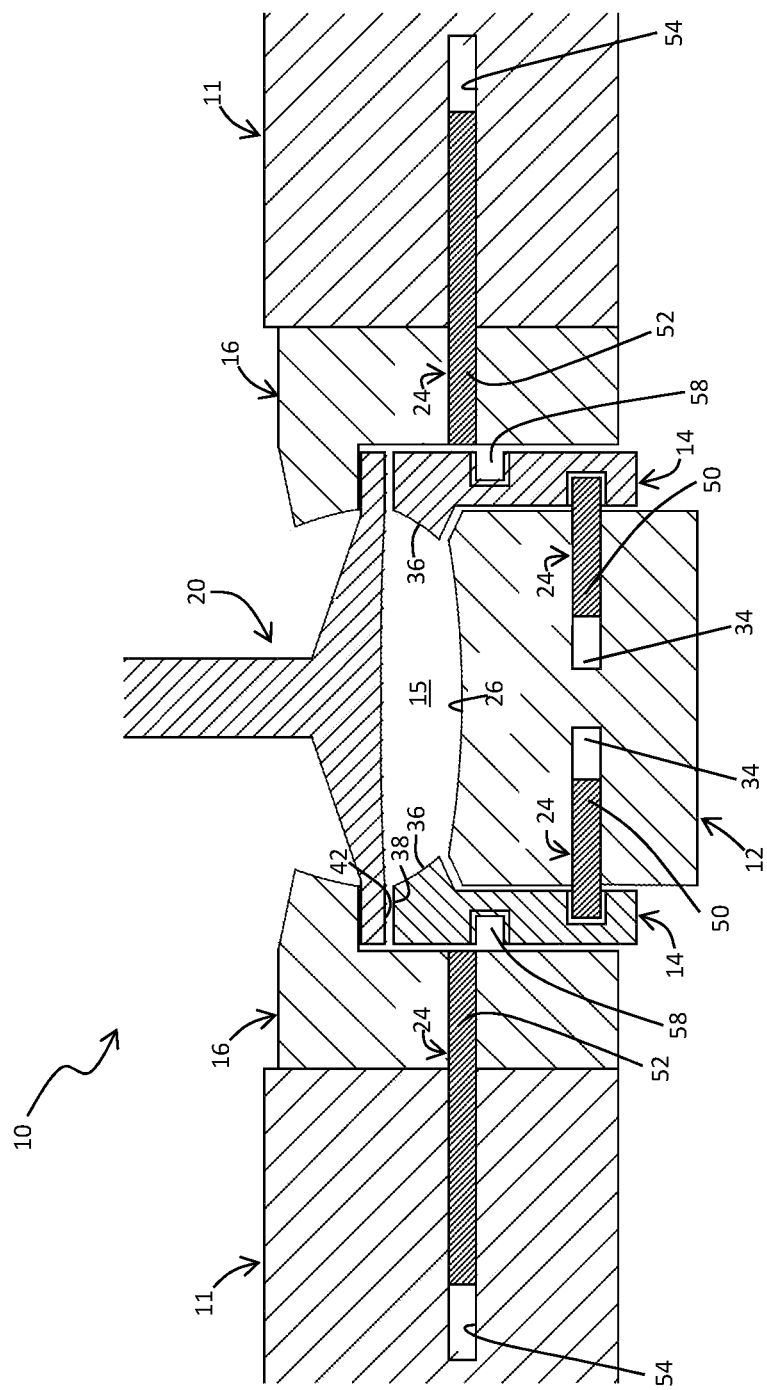
Figure 9:
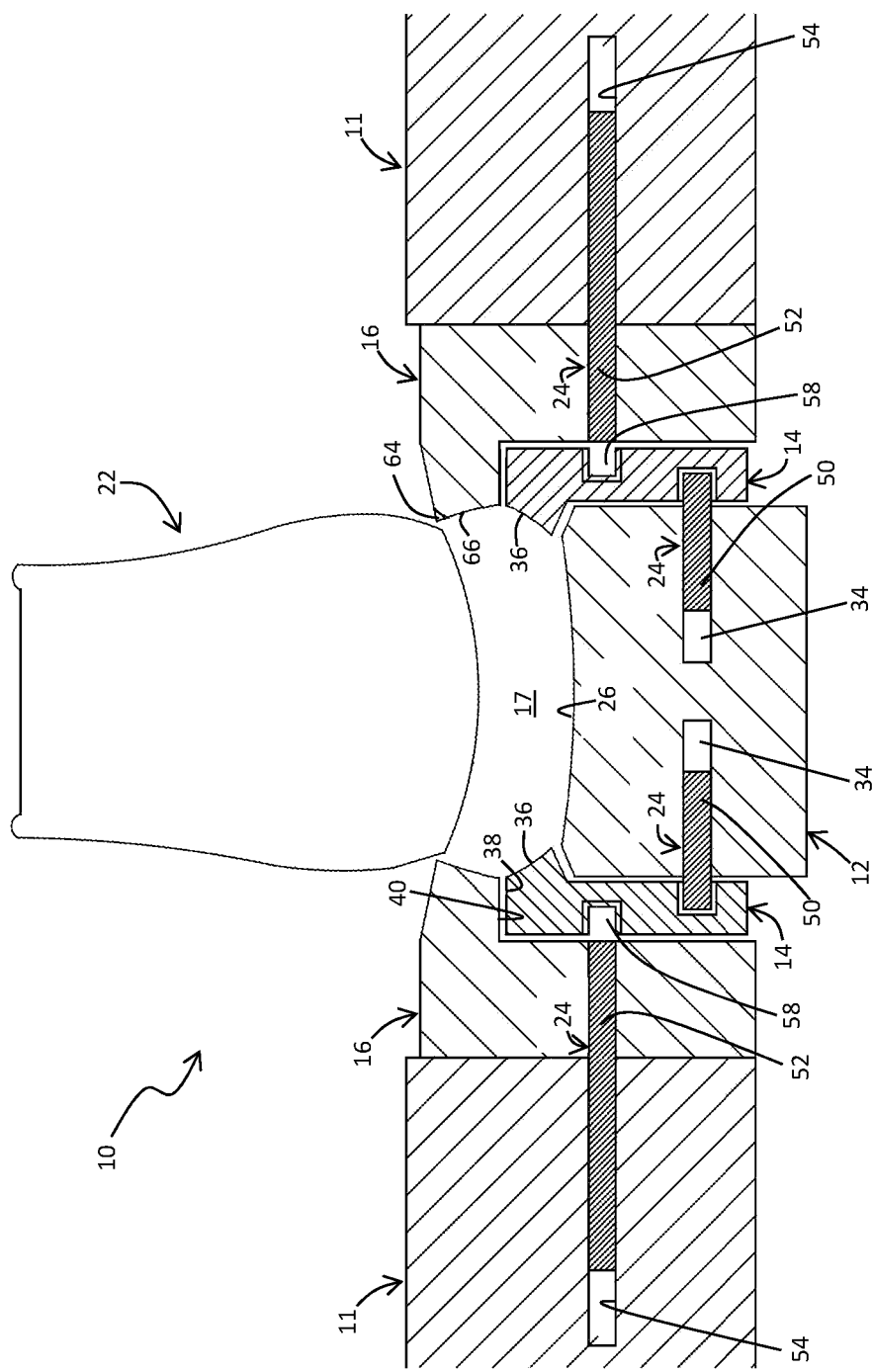

With reference firstly to FIGS. 7 to 9, a mould provided in accordance with the principles of the present invention is indicated overall by the number 10.

This mould 10 is designed to be used to manufacture footwear 1 by means of direct injection onto the upper 2 of a sole 3, comprising a tread 5 and a midsole 4, in which the midsole 4 is composed of a first layer 6 and a second layer 7 (see FIGS. 1-3 and 1A-3A).

The sole 3 and the midsole 4 are made of polymeric material.

Preferably, the tread 5 is made using a polyurethane mixture of the compact type or of thermoplastic polyurethane (TPU), while the first layer 6 and the second layer 7 of the midsole 4 are generally made using an expanded or compact polyurethane mixture.

Advantageously, the tread 5, the first layer 6 and the second layer 7 may be made using different materials and/or made using the same materials which have, however, different mechanical properties and/or colours.

The mould 10 is intended to be mounted in a mould-holder station of a moulding machine of the type commonly used to manufacture footwear by means of direct injection onto the upper. The mould-holder station comprises in a known manner a support, a mould-holder drawer and a last-holder and/or cover-holder assembly.

The attached figures, for example FIGS. 7 to 9, show partially the mould-holder drawer 11 of the station on which the mould 10 is to be mounted. The mould-holder station and the machine are not shown together, being well-known to the person skilled in the art.

Figure 6:
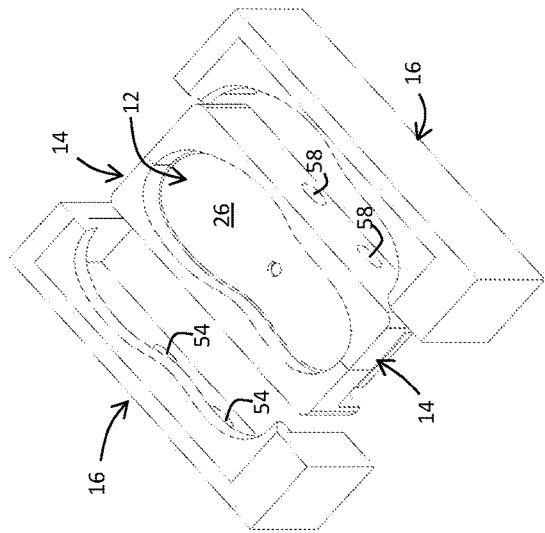
FIGS. 5 and 6 show schematic perspective views, in different operating configurations, of the components shown in FIG. 4.
Figure 5:
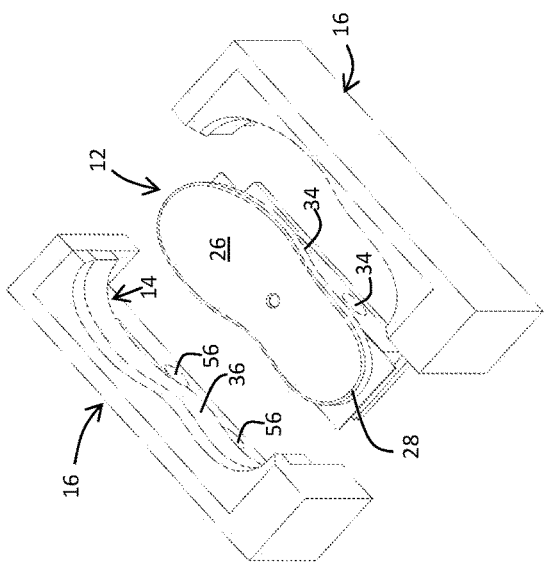
Figure 4:
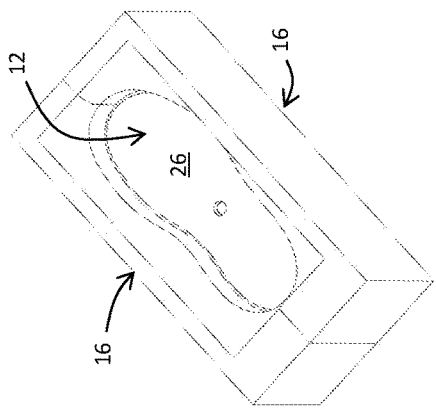
FIG. 4 shows a schematic perspective view in which the first half-rings and the second half-rings of the mould according to the invention are arranged next to the base thereof.

With reference to FIGS. 4 to 6, the mould 10 comprises a base 12, a pair of first half-rings 14 and a pair of second half-rings 16.

The mould 10 further comprises a first cover 18, a second cover 20 and a mould last 22 (see FIGS. 7, 8, 9, respectively).

The first half-rings 14 are designed to be brought together so as to abut against the base 12 and against the first cover 18, so as to form a first mould cavity 13 (see FIG. 7).

The first half-rings 14 are also designed to be brought together so as to abut against the base 12 and against the second cover 20, so as to form a second mould cavity 15 (see FIG. 8).

With the first half-rings 14 abutting against the base 12, the second half-rings 16 are designed to be brought together so as to be superimposed on the first half-rings 14 and to abut, with their top edge, against any upper which is fitted onto the mould last 22. In this way, the second half-rings 16, together with the base 12, the first half-rings 14 and the mould last 22 form a third mould cavity 17 (see FIG. 9).

In accordance with the invention, the mould 10 comprises, furthermore, gripping means 24 designed to selectively fix the first half-rings 14 to the base 12 (see FIGS. 8 and 9) or to the second half-rings 16 (see FIG. 7).

Advantageously, each first half-ring 14 may be fixed either to the base 12 or to the adjacent second half-ring 16.

Preferably, the gripping means 24 comprise first coupling means 50, provided between the base 12 and the first half-rings 14, and second coupling means 52, provided between the first half-rings 14 and the second half-rings 16.

Preferably, the first coupling means 50 are provided inside first receiving seats 34 formed in the base 12, while the second coupling means 52 are provided inside second receiving seats 54 formed in the second half-rings 16. As will become clear from the description below, the second receiving seats 54 of the second half-rings 16 may extend also emerging on the facing surfaces of the mould-holder drawer 11, as shown for example in FIGS. 7-9.

Each first receiving seat 34, as can be seen also in FIG. 6, is preferably formed in the side surface of the base 12 so as to face the inner side surface of one of the two first half-rings 14, the inner side surface being understood as being the surface of the first half-rings which is closest to the base 12.

Each second receiving seat 54, as can be seen in FIG. 5, is preferably formed in the inner side surface of one of the two second half-rings 16, the inner surface being understood as being the surface of the second half-rings 16 closest to the first half-rings 14.

In the embodiment shown in FIG. 6, the base 12 is provided with two receiving seats 34 which are provided respectively in the vicinity of the rear zone and the front zone of the base 12.

Each receiving seat 34 preferably consists of a groove or a hole. It extends advantageously along a plane transverse to the base, located substantially parallel to the plane in which the support of the mould-holder station lies.

In turn, the first half-rings 14 are preferably provided with engaging seats 56, 58 configured to be engaged by the gripping means 24.

As will become clear from the description which follows, during use of the mould 10, these engaging seats 56, 58 are intended to be aligned with the receiving seats 34 of the first coupling means 50 and/or with the receiving seats 54 of the second coupling means 52.

Advantageously, the engaging seats 56, 58 are provided respectively on the inner side surface and the outer side surface of each first half-ring 14, where the outer side surface is understood as being the side surface of the first half-ring configured to abut against the adjacent second half-ring 16.

Preferably, the engaging seats 56, 58 are provided staggered with respect to each other, i.e. at a different height (see for example FIG. 7). According to an alternative embodiment they are positioned in the same plane.

Figure 10:
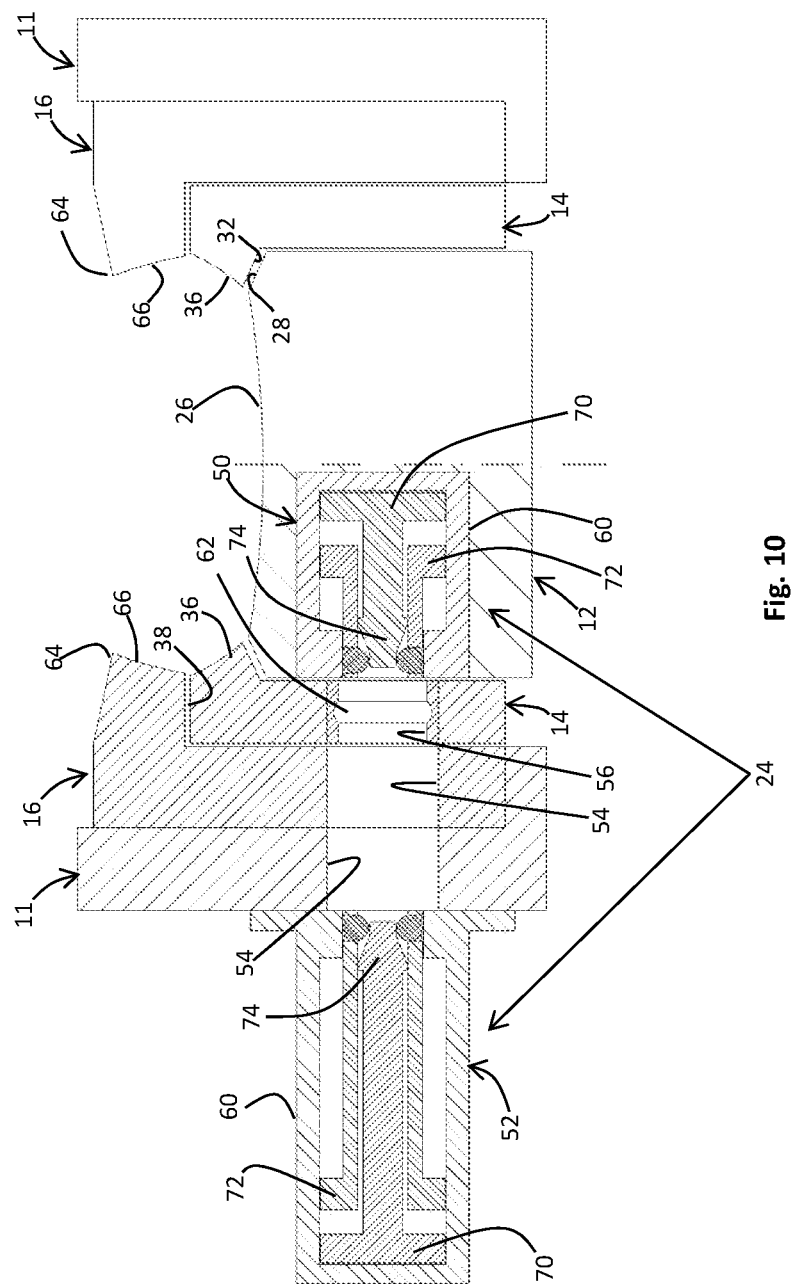
FIG. 10 shows a schematic partially cross-sectioned view of a constructional detail of the mould according to the invention.

According to a further alternative embodiment, the engaging seats 56, 58 are in fluid communication with each other (see for example FIG. 10, in which the single seat is identified by the reference number 56). In this embodiment the engaging seats 56 consist therefore of a single throughhole which crosses the first half-ring 14 from side to side in the transverse direction.

As shown in FIGS. 7-9, the first coupling means 50 and the second coupling means 52 may move, by means of the use of known actuators of the mechanical type, for example pneumatic, hydraulic or electrical actuators, between a retracted position and an engaging position.

In the retracted position, the terminal ends of the first coupling means 50 and the second coupling means 52 do not project from the respective receiving seats 34, 54 formed in the base 12 and in the second half-rings 16 towards the outer and inner side surfaces of a respective first half-ring 14.

In the engaging position the terminal ends of the first coupling means 50 and the second coupling means 52 project from the respective receiving seats 34, 54 so as to engage with the respective engaging seats 56, 58 of the first half-rings 14, so that the first half-rings 14 may be fixed to the base 12 or to the second half-rings 16.

In detail, when the first coupling means 50 are in their retracted position, the second coupling means 52 may be advantageously in their engaging position (see for example FIG. 7) so that the second half-rings 16 may be fixed to the first half-rings 14.

Vice versa, when the first coupling means 50 are in their engaging position, the second coupling means 52 may be advantageously in their retracted position (see for example FIGS. 8 and 9) so that the first half-rings 14 may be fixed to the base 12.

The movements of the first coupling means 50 and of the second coupling means 52 are managed preferably by the same control unit, not shown in the attached figures, which controls the movements of the various components of the mould during the moulding operations.

The ends of the coupling means 50, 52 are configured to engage with the engaging seats 56, 58 so as to exert a gripping action on the inner surface thereof (see FIGS. 7-9).

This gripping action may take place owing to the frictional forces which are generated between the inner surface of the engaging seats 56, 58 and the ends of the coupling means 50, 52. Alternatively, the gripping action may be achieved by means of a form-fit connection between the ends of the coupling means 50, 52 and the engaging seats 56, 58.

In an alternative embodiment not shown in the attached figures, suitable fixing pins may be provided inside the engaging seats 56, 58.

In this case the ends of the coupling means 50, 52 are designed to exert a gripping action on the outer surface of said pins.

The coupling means 50, 52 may consist of grippers of the parallel, radial or angular type having two or more claws.

In a preferred embodiment the first coupling means 50 and the second coupling means 52 of the gripping means 24 consist of two pairs of ball grippers (see FIGS. 10-12). In these figures, for greater clarity, only the grippers provided in a first half of the mould are shown. In the opposite half the grippers may be positioned in a mirror arrangement.

A first pair of ball grippers, forming the first coupling means 50, is housed inside the base 12, on the surfaces facing the first half-rings 14.

These grippers below will also be called inner grippers.

Each gripper of the second pair of grippers, called outer grippers below, is intended to act inside a seat 54 which extends inside the mould-holder drawer 11 and inside the second half-ring 16.

In FIG. 10, in order to clarify the structure of the gripping means 24, an inner gripper and an outer gripper are shown in their retracted position.

FIG. 11 and FIG. 12 show, respectively, the outer gripper in the engaging position, with the inner gripper in the retracted position, and the outer gripper in the retracted position, with the inner gripper in the engaging position.

Each ball gripper is preferably provided with a housing 60 inside which a first actuator 70 and a second actuator 72 may be arranged, wherein the first actuator 70 which has an end with a flared form 74 is movable slidably inside the second actuator 72, as shown for example in FIGS. 13A-13C with reference to the inner gripper.

Two or more ball grippers 76, which are inserted inside special seats 78 when the gripper is in the retracted position, may be provided at the end of the second actuator 72.

With reference to FIG. 13A, in the retracted position of the ball gripper, the ends of the first and second actuators are contained inside the housing 60. Following pneumatic operation of the gripper, the first actuator 70 and the second actuator 72 move from their retracted position into their extracted position, so that the respective ends emerge from the housing 60 (see FIG. 13B). The first actuator 70 slides inside the second actuator 72 until a bottom surface 71 thereof, opposite the flared end 74, abuts against an abutting surface 73 of the second actuator 72. During the movement, the flared end 74 of the first actuator 70 comes into contact with the gripping balls 76 of the second actuator 72, pushing them outwards so that they engage inside corresponding grooves 62 provided along the inner walls of the engaging seats 56 of a respective first half-ring 14, so as to exert the required gripping action (see FIG. 13C).

Once the gripping action is no longer required, the first actuator 70 and the second actuator 72 may return into their initial position owing to the provision of elastic means.

The end 74 of the first actuator 70 is recalled inside the second actuator and, since there is no longer any thrusting action being exerted on the balls 76, the latter are disengaged from the seats 62 so as to be housed again inside the seats 78.

Operation of the outer ball grippers is similar to that described above with reference to the inner ball grippers.

As shown in FIG. 11, when the outer gripper is located in its gripping position, the inner gripper is in its retracted position.

In this configuration, the first half-rings 14 are placed so as to abut against the second half-rings 16 and are fixed thereto.

In view of the fact that the second half-rings 16 are in turn fixed to the mould-carrier drawer 11, in this configuration, any opening/closing movements of the mould-holder drawer (schematically indicated by the arrows R) will cause opening and closing of the first half-rings 14 and the second half-rings 16 in an integral manner.

As shown in FIG. 12, when the inner gripper is located in its gripping position, the outer gripper is in its retracted position.

In this configuration, the first half-rings 14 are placed in abutment against the base 12 and are fixed thereto.

In this configuration, any opening/closing movements of the mould-holder drawer (schematically indicated by the arrows R) will cause opening and closing of the second half-rings 16, fixed to the mould-holder drawer 11, but not of the first half-rings 16 which will remain rigidly locked together with the base 12.

Below, the remaining components of the mould 10 according to the invention will be described in detail.

The base 12 of the mould 10, in a known manner, may be fixed to the support of the mould-holder station of the moulding machine and may be moved, towards and away from the covers and from the mould last, along the direction T, perpendicular to the plane in which the support lies (see FIG. 7).

With reference to FIGS. 4-6, the base 12 is provided with an impression 26, intended to form the outer surface of the tread 5.

The impression 26 is preferably bounded by a perimetral edge 28. When the base 12 is placed in abutment against the first cover 18, the perimetral edge 28 is configured to abut against a corresponding abutting surface 30 of the first cover 18 (see FIG. 7) in order to define the first mould cavity 13. This first mould cavity 13 is intended to be filled with a first polymeric material so as to allow the formation of the tread 5.

As is clearly visible in FIG. 7, the first mould cavity 13 is bounded at the bottom by the impression 26 of the base 12 and at the top by the first cover 18.

During use of the mould 10, the perimetral edge 28 of the base 12 may be placed so as to abut against also the first half-rings 14. In this configuration of the mould 10, the perimetral edge 28 of the base 12 is intended to abut against a corresponding abutting surface 32 of each first half-ring 14 (See FIGS. 10-12).

As will become clear from the description below, by means of this relative positioning of the base 12 and the first half-rings 14, it is possible to obtain in combination with the second cover 20, the second mould cavity 15 (see FIG. 8) and, in combination with the second half-rings 16 and the mould last 22, the third mould cavity 17 (see FIG. 9).

Each first half-ring 14, in addition to the abutting surface 32, designed to abut against the perimetral edge 28 of the base 12 or against the perimetral edge of the first cover 18, comprises a lateral impression 36 and a closing edge 38, as shown in FIGS. 7-9.

The lateral impression 36 has dimensions and a finish corresponding to a first half of the first layer 6 of the midsole 4.

The closing edge 38 is designed to abut against a corresponding abutting surface 42 of the second cover 20 (see FIG. 8) or against an abutting surface 40 of the second half-ring 16 (see FIG. 9).

As shown in FIG. 9, each second half-ring 16 has a top closing edge 64, designed to abut against the sides of the upper, mounted on the mould last 22, and a lateral impression 66, having dimensions and a finish corresponding to a half of the second layer 7 of the midsole 4.

As shown in the attached figures, when brought together, the two half-rings 16 are designed to enclose inside them the first half-rings 14.

As already mentioned, the second half-rings 16 may be moved by means of known linear actuators provided in the mould-holder drawer 11.

When the closing edge 38 of the first half-rings 14 abuts against the abutting surface 42 of the second cover 18, the two first half-rings 14, the base 12 and the second cover 18 define the second mould cavity 15. This second mould cavity 15, which is bounded at the bottom by the impression 26, on the sides by the first half-rings 14 and at the top by the first cover 18, is used for moulding of the first layer 6 of the midsole 4 (see FIG. 8).

As will become clear from the description below, the second layer 6 will be obtained by means of casting or spraying of a polymeric mixture on top of the tread 5 which is formed during a preceding moulding step and which is arranged on the impression 26.

When the closing edge 38 of the first half-rings 14 abuts against the locating surface 40 of the second half-ring 16, the two first half-rings 14, the two second half-rings 16, the base 12 and the mould last 22 define the third mould cavity 17. This third mould cavity 17, which is bounded at the bottom by the impression 26, on the sides by the lateral impressions 36, 66 of the first half-rings 14 and of the second half-rings 16 and at the top by the bottom profile of the mould last 22, is used for moulding of the second layer 7 of the midsole 4.

The second layer 7 is obtained by means of casting or spraying of a polymeric mixture on top of the first layer 6 and optionally on top of the tread 5, which have been formed during the preceding moulding steps described above and which occupy the bottom portion of the third mould cavity 17.

The first cover 18, the second cover 20 and the mould last 22 are in a known manner intended to be mounted, spaced at 120° from each other, on the last-holder assembly of the mould-holder station. Usually this last-holder assembly is rotatable through 360°, about its transverse axis, so as to arrange the first cover 18, the second cover 20 and the mould last 22, alternately facing the base 12, as required.

The present invention also relates to a method for producing footwear 1 by means of direct injection onto the upper. Advantageously this method may be performed by means of the mould 10 described above.

Figure 14:
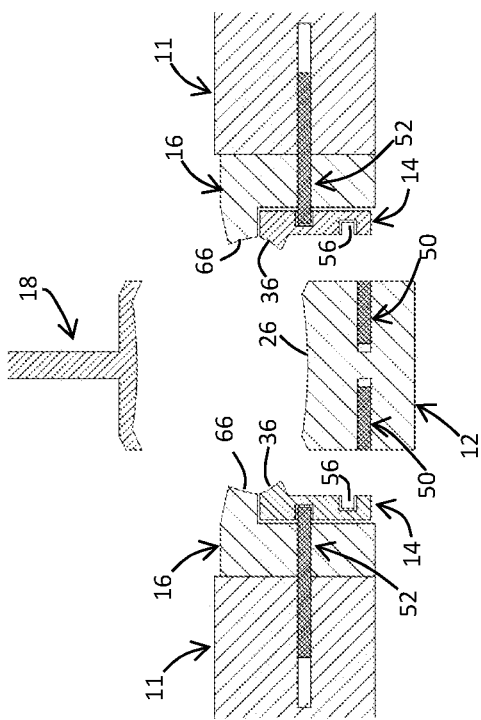
FIGS. 14-24 show schematically some steps of a mode of implementation of the method according to the invention.
Figure 15:
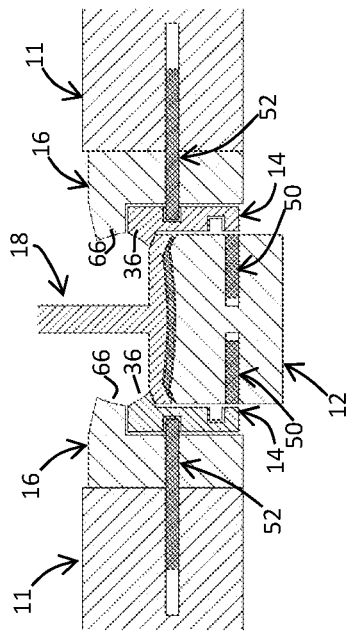
Figure 16:
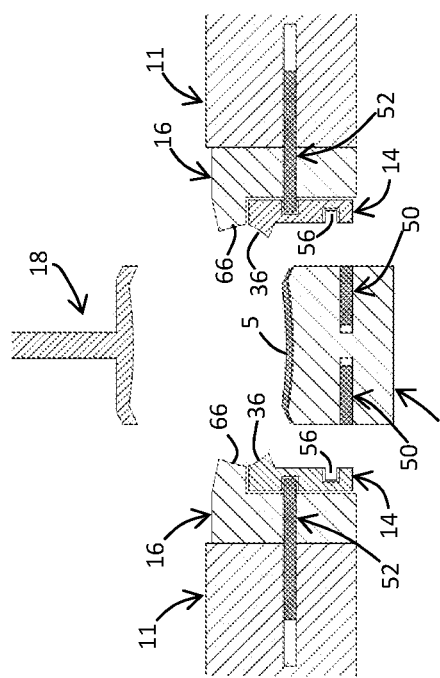
Figure 17:
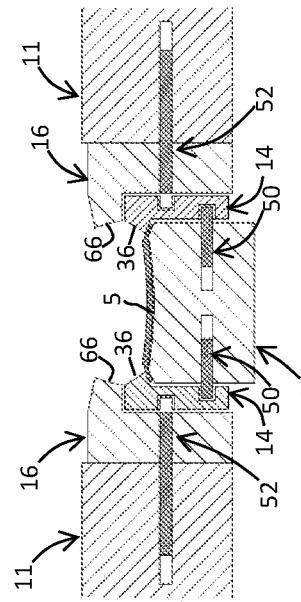
Figure 19:
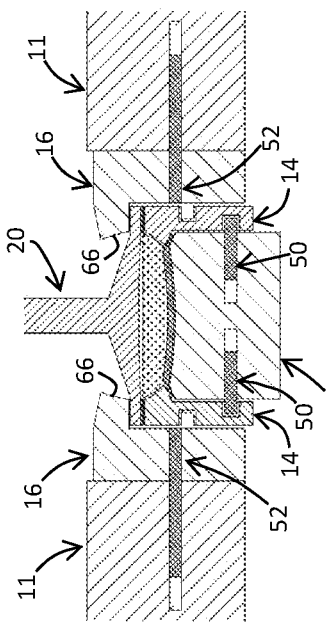
Figure 21:
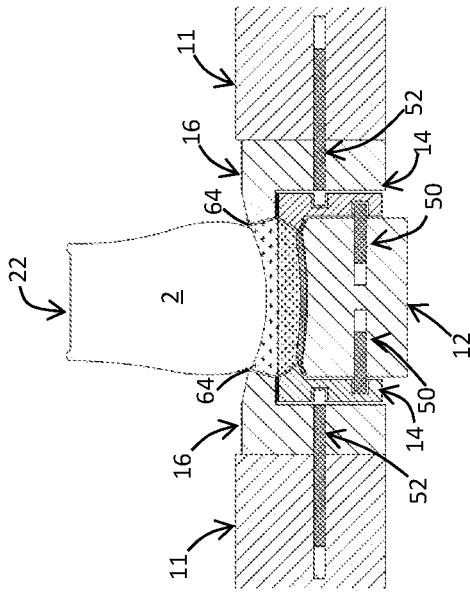
Figure 20:
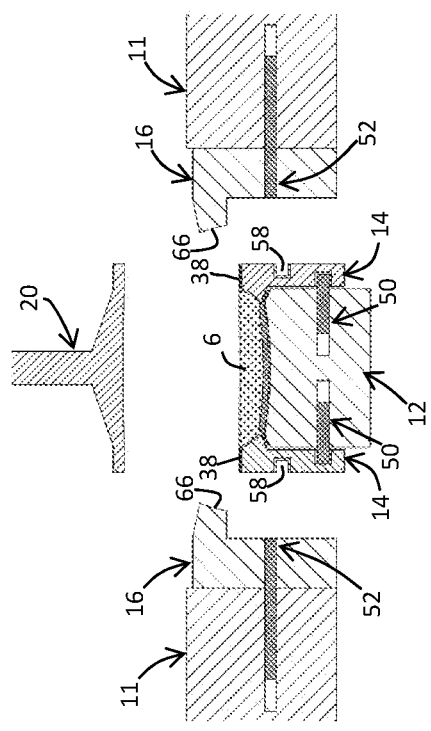
Figure 23:
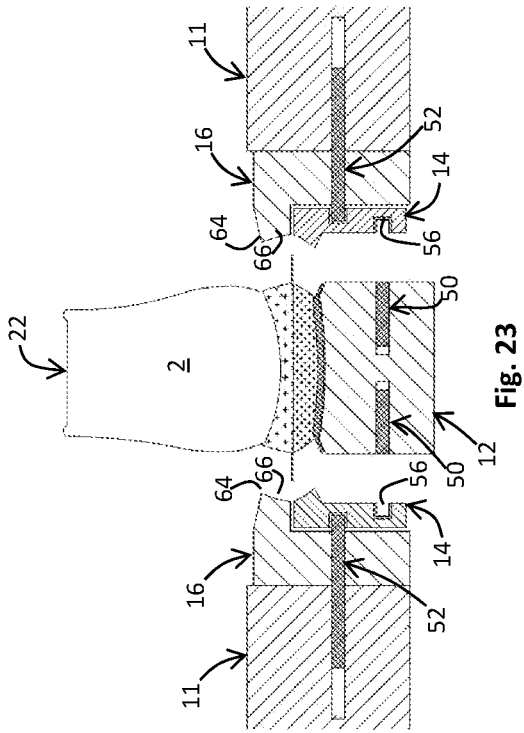
Figure 22:
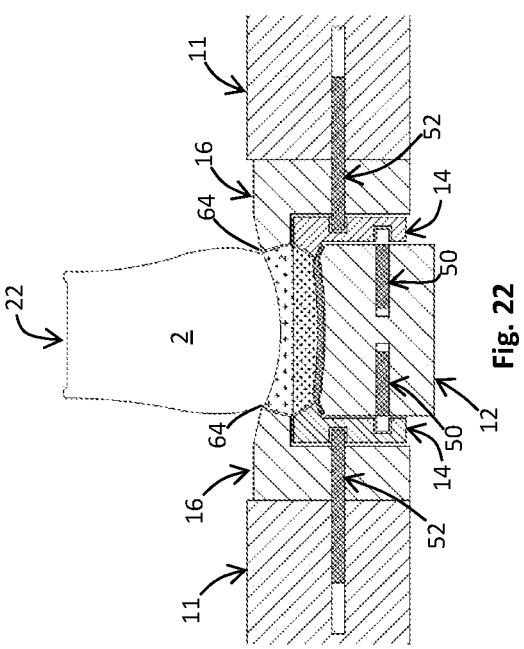

In particular the method according to the invention comprises the following steps:

providing a mould 10;

fixing the first half-rings 14 to the second half-rings 16 by means of the gripping means 24, preferably by means of the second coupling means 52 in their engaging position (FIG. 14);

closing the second half-rings 16 so as to bring the first half-rings 14 into abutment against the base 12 and the first cover 18, so as to define the first mould cavity 13;

introducing a first polymeric mixture inside said first mould cavity 13 so as to form the tread 5 of the sole 3 (FIGS. 15 and 16);

disengaging the first half-rings 14 from the second half-rings 16, preferably by moving the second coupling means 52 into their retracted position, and fixing the first half-rings 14 to the base 12 by means of the gripping means 24, preferably by means of the first coupling means 50 in their engaging position (FIG. 17).

closing the second half-rings 16 against the first half-rings 14 and against the second cover 20, so as to define the second mould cavity 15;

introducing a second polymeric mixture inside said second mould cavity 15 so as to form the first layer 6 of the midsole 4 (FIGS. 19 and 20);

closing the second half-rings 16 against the first half-rings 14 and against the upper 2 fitted onto the mould last 22, so as to define the third mould cavity 17;

introducing a third polymeric mixture inside said third mould cavity 17 so as to form the second layer 7 of the midsole 4 (FIG. 21);

disengaging the first half-rings 14 from the base 12, preferably by moving the first coupling means 50 into their retracted position, and fixing the first half-rings 14 to the second half-rings 12 by means of the gripping means 24, preferably means of the second coupling means 52 in their engaging position;

opening the second half-rings 20 (FIGS. 22 and 23);

removing the footwear 1 from the mould last 22.

Preferably, closing of the second half-rings 16 to define the first mould cavity 13 or the second mould cavity 15 is performed after the first cover 18 or the second cover 20 have been placed against the base 12.

As described above, with reference to FIGS. 14-16, fixing of the first half-rings 14 to the second half-rings 16 may be performed by means of the second coupling means 52 which are located in their engaging position. In this configuration the first coupling means 50 are located in their position retracted inside the base 12.

This allows the first half-rings 14 to be moved integrally with the second half-rings 16 such that closing or opening of the second half-rings 16 causes closing or opening of the first half-rings 14.

Initially the second half-rings 16 are brought together so as to bring the first half-rings 14 into abutment against the base 12 and the first cover 18, after the latter has been placed against the base 12 so as to define the first mould cavity 13 and allow moulding of the tread (FIG. 15). Preferably, in this configuration the perimetral edge of the first cover 18 is locked between the perimetral edge 28 of the base 12 and the abutting surface 32 of the first half-rings 14. The subsequent opening of the second half-rings 16 allows the first half-rings 14 to be spaced from the base 12 so as to allow the raising of the first cover 18 (see FIG. 16).

Thereafter the second half-rings 16 are closed again so as to bring the first half-rings 14 back into abutment against the base 12.

In this configuration, the second coupling means 52 are brought into their retracted position, so as to be disengaged from the first half-rings 14, while the first coupling means 50 are brought into their extracted position, so as to make integral the base 12 and the first half-rings 14 (FIG. 17).

Figure 18:
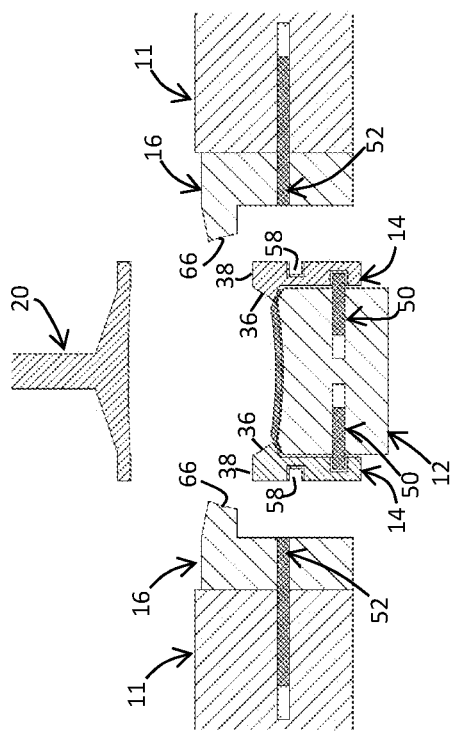

Then the second half-rings 16 are opened in order to allow the downward movement of the second cover 20 (FIG. 18). Then the second half-rings 16 are again brought together so as to abut against the first half-rings 14, which are fixed to the base 12, and the second cover 20, after the latter has been placed against the first half-rings 14, thus forming the second mould cavity 15 (FIG. 19).

When the second mould cavity 15 is defined, the perimetral edge of the second cover 20 is locked between the closing edge 38 of the first half-rings 14 and the abutting surface 40 of the second half-rings 16.

Once moulding of the first layer 6 of the midsole 4 has been completed, the second half-rings 16 are again opened to allow raising of the second cover 20 and replacement with the mould last 22 on which the upper 2 is fitted. Then the second half-rings 16 are brought together so as to enclose the first half-rings 14 and abut with their top edge 64 against the sides of the upper 2 fitted onto the mould last 22, after the mould last 22 has been placed against the second half-rings 16, so as to define the third mould cavity 17. A third polymeric mixture is injected inside this cavity in which already the tread 5 and the first layer 6 of the midsole 4, moulded beforehand, are already located (FIGS. 20 and 21).

Following injection of the third polymeric mixture, the first coupling means 50 are brought into their position retracted inside the base 12 and the second coupling means 52 are brought into their gripping position. In this way the first half-rings 14 are disengaged from the base 12 and made integral with the second half-rings 16 (FIG. 22).

This allows, by means of opening of the second half-rings 16, separation also of the first half-rings 14, thus allowing extraction of the footwear thus formed by the mould (FIG. 23).

Figure 24:
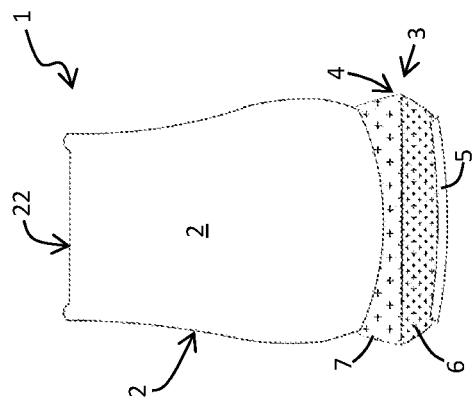

The footwear 1 may be then removed from the mould last 22 (see FIG. 24) and undergo the usual finishing operations.

In a known manner, the introduction of the first, second and third polymeric mixture may be performed by means of an injection-moulding, casting or spraying process.

From that described above it is clear how, with the mould and the method according to the present invention, the predefined object and tasks may be achieved.

With the mould and the method according to the present invention the tread 5 and the midsole 4 of the sole 3 may be advantageously formed in succession, without having to load inside the base 12 a tread moulded separately by means of a different mould.

With the mould and the method according to the invention it is therefore possible to reduce the time required for the production of footwear having a triple-layer sole, allowing an increase in productivity.

Moreover, the mould 10, although provided with gripping means 24, may be used with conventional moulding machines without requiring any structural modification.

The movements performed by the base 12 and by the second half-rings 16 are performed in a known manner, as are the movements of the covers 18, 20 and the mould last 22.

Moreover, the first half-rings 14 and the second half-rings 16 are advantageously configured to be positioned inside a mould-holder drawer of the conventional type.

The person skilled in the art, in order to satisfy specific needs, may make modifications to the embodiments described above and/or replace the elements described with equivalent elements, without thereby departing from the scope of the attached claims.

For example, the gripping means 24 may be housed inside each of the first half-rings 14 and in their extracted configuration move alternately towards the facing surfaces of the base or the corresponding second half-ring 16.

The invention claimed is:

1. A mould for producing footwear by means of direct injection onto an upper of a sole comprising a tread and a midsole, wherein the midsole is composed of a first layer and a second layer;

the mould comprising a base, a pair of first half-rings, a pair of second half-rings, a first cover, a second cover and a mould last, wherein the first half-rings are designed to be brought together so as to abut against the base and against the first cover, so as to form a first mould cavity for moulding the tread, and/or to abut against the base and against the second cover, so to form a second mould cavity for moulding the first layer of the midsole; and wherein, with the first half-rings abutting against the base, the second half-rings are designed to be brought together, so as to be superimposed on the first half-rings and to abut against the upper, fitted onto the mould last, so as form a third mould cavity for moulding the second layer of the midsole;

the mould being characterized in that it comprises gripping means designed to fix selectively the first half-rings to the base or to the second half-rings.

2. The mould according to claim 1, characterized in that the gripping means comprise first coupling means, provided between the base and the first half-rings, and second coupling means, provided between the first half-rings and the second half-rings.

3. The mould according to claim 2, characterized in that the first coupling means are provided inside at least one first receiving seat formed in the base and in that the second coupling means are provided at least partially inside at least one second receiving seat formed in the second half-rings.

4. The mould according to claim 3, characterized in that said at least one first receiving seat is formed on a side surface of the base, so as to face an inner side surface of one of the two first half-rings.

5. The mould according to claim 3, characterized in that said at least one second receiving seat is formed on a side surface of one of the two second half-rings, so as to face an outer side surface of one of the two first half-rings.

6. The mould according to claim 1, characterized in that each of the first half-rings is provided with engaging seats configured to be engaged by the gripping means, said engaging seats being provided on an inner side surface and an outer side surface of each first half-ring.

7. The mould according to claim 1, characterized in that said engaging seats are in fluid communication with each other.

8. The mould according to claim 2, characterized in that the first coupling means and the second coupling means are designed to move between a retracted position and an engaging position.

9. The mould according to claim 8, characterized in that each of the first half-rings is provided with engaging seats configured to be engaged by the gripping means, said engaging seats being provided on an inner side surface and an outer side surface of each first half-ring, and characterized in that in the retracted position the terminal ends of the first coupling means and the second coupling means do not project from the respective receiving seats and in that in the engaging position the terminal ends of the first coupling means and the second coupling means engage inside the respective engaging seats.

10. The mould according to claim 1, characterized in that the gripping means consist of grippers of the parallel, radial or angular type having two or more claws.

11. The mould according to claim 2, characterized in that the first coupling means and the second coupling means of the gripping means comprise at least one ball gripper.

12. The mould according to claim 11, characterized in that said at least one ball gripper is provided with a housing;
  inside said housing there being arranged a first actuator and a second actuator, the first actuator having an end with a flared form and being movable slidably inside the second actuator.

13. The mould according to claim 12, characterized in that two or more gripping balls are provided at the end of the second actuator, said gripping balls being inserted inside special seats.

14. The mould according to claim 13, characterized in that each of the first half-rings is provided with engaging seats configured to be engaged by the gripping means, said engaging seats being provided on an inner side surface and an outer side surface of each first half-ring, and characterized in that, following sliding of the first actuator inside the second actuator, the flared end of the first actuator comes into contact with the gripping balls, pushing them outwards so as to engage with special grooves provided in the engaging seat so as to exert the gripping action.

15. A method for producing footwear by means of direct injection onto an upper of a sole comprising a tread and a midsole, wherein the midsole is composed of a first layer and a second layer, the method comprising the following steps:
  providing a mould according to claim 1;
  fixing the first half-rings to the second half-rings by means of the gripping means;
  closing the second half-rings so as to bring the first half-rings into abutment against the base and the first cover, after the cover has been placed against the base, so as to define a first mould cavity;
  introducing a first polymeric mixture inside said first mould cavity so as to form the tread of the sole;
  disengaging the first half-rings from the second half-rings and fixing the first half-rings to the base by means of the gripping means;
  closing the second half-rings against the first half-rings and against the second cover, after the second cover has been placed against the first half-rings, so as to define a second mould cavity;
  introducing a second polymeric mixture inside said second mould cavity so as to form the first layer of the midsole;
  closing the second half-rings against the first half-rings and against the upper fitted onto the mould last, after the mould last has been placed against the second half-rings, so as to define a third mould cavity;
  introducing a third polymeric mixture inside said third mould cavity so as to form the second layer of the midsole;
  disengaging the first half-rings from the base and fixing the first half-rings to the second half-rings by means of the gripping means;
  opening the second half-rings; and
  removing the footwear from the mould last.

16. The method according to claim 15, characterized in that the gripping means comprise first coupling means and second coupling means designed to move between a retracted position and an engaging position, the step of fixing the first half-rings to the second half-rings being performed by means of the second coupling means in their engaging position and the step of fixing the first half-rings to the base being performed by means of the coupling means in their engaging position.

17. The method according to claim 16, characterized in that, with the first coupling means in their engaging position, the second coupling means are located in their retracted position and with the second coupling means in their engaging position, the first coupling means are located in their retracted position.

18. The method according to claim 16, characterized in that, with the second coupling means in their engaging position, the opening or closing of the second half-rings causes the opening or closing of the first half-rings.

19. The method according to claim 15, characterized in that the introduction of the first, second and third polymeric mixture is performed by means of an injection-moulding, casting or spraying process.

* * * * *